(12) United States Patent
Okaizumi et al.

(10) Patent No.: US 8,535,038 B2
(45) Date of Patent: Sep. 17, 2013

(54) FOOD DOUGH FORMING APPARATUS AND FOOD DOUGH FORMING METHOD

(75) Inventors: Hiroyuki Okaizumi, Tochigi (JP); Takao Takagi, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 752 days.

(21) Appl. No.: 12/595,847

(22) PCT Filed: Apr. 15, 2008

(86) PCT No.: PCT/JP2008/057352
§ 371 (c)(1),
(2), (4) Date: Dec. 23, 2009

(87) PCT Pub. No.: WO2008/133114
PCT Pub. Date: Nov. 6, 2008

(65) Prior Publication Data
US 2010/0104719 A1    Apr. 29, 2010

(30) Foreign Application Priority Data

Apr. 16, 2007    (JP) ................... 2007-107417

(51) Int. Cl.
*A21C 3/08*    (2006.01)
(52) U.S. Cl.
USPC ........ 425/296; 425/305.1; 425/322; 425/323; 425/334; 425/364 B; 425/391; 425/392; 426/500
(58) Field of Classification Search
CPC ........................................ A21C 11/00
USPC ................ 426/500, 503, 518, 517; 425/322, 425/324.1, 305.1, 296, 308, 317, 319, 323, 425/321, 364 B, 334, 391, 392, 470, 471; 264/339
See application file for complete search history.

(56) References Cited

U.S. PATENT DOCUMENTS

| | | | | |
|---|---|---|---|---|
| 1,906,847 A | * | 5/1933 | Fitzgerald | 425/321 |
| 3,398,701 A | * | 8/1968 | Elgner | 425/321 |
| 5,009,910 A | * | 4/1991 | Zwicker | 426/499 |
| 5,354,571 A | * | 10/1994 | Morikawa et al. | 426/496 |
| 5,466,143 A | * | 11/1995 | Suzuki et al. | 425/140 |
| 5,556,660 A | * | 9/1996 | Schutz | 426/499 |

(Continued)

FOREIGN PATENT DOCUMENTS

| | | |
|---|---|---|
| DE | 19507722 A1 * | 9/1996 |
| FR | 2649591 | 1/1991 |

(Continued)

OTHER PUBLICATIONS

Translation of JP 2006-55012, p. 22, date not applicable.*

(Continued)

*Primary Examiner* — Dimple Bodawala
(74) *Attorney, Agent, or Firm* — Greenblum & Berstein, P.L.C.

(57) ABSTRACT

A food dough forming apparatus for joining together a first end face of a rod-shaped food dough and a second end face of another rod-shaped food dough, the apparatus including: deforming and facing means for deforming the food doughs so as to cause the first end face and the second end face to face each other; and joining means for joining together the end faces caused to face each other by the deforming and facing means.

5 Claims, 7 Drawing Sheets

(56) References Cited

U.S. PATENT DOCUMENTS

| | | | | |
|---|---|---|---|---|
| 5,702,732 A | * | 12/1997 | Piller | 425/145 |
| 5,866,174 A | | 2/1999 | Harada et al. | |
| 5,955,118 A | * | 9/1999 | Powell | 425/323 |
| 6,136,360 A | * | 10/2000 | Tsuchida et al. | 426/500 |
| 6,444,245 B1 | | 9/2002 | Burger | |
| 6,715,518 B2 | * | 4/2004 | Finkowski et al. | 141/129 |
| 6,833,147 B2 | * | 12/2004 | Namai et al. | 426/231 |
| 2003/0228396 A1 | * | 12/2003 | Okaizumi et al. | 426/89 |
| 2007/0048423 A1 | * | 3/2007 | Bernhardt | 426/499 |

FOREIGN PATENT DOCUMENTS

| | | | |
|---|---|---|---|
| GB | 1253863 | | 11/1971 |
| JP | 59220160 A | * | 12/1984 |
| JP | 61-289842 | | 12/1986 |
| JP | 9-187251 | | 7/1997 |
| JP | 2004-8004 | | 1/2004 |
| JP | 2004-8122 | | 1/2004 |
| JP | 2006-55012 | | 3/2006 |
| JP | 2006055012 A | * | 3/2006 |

OTHER PUBLICATIONS

English language Abstract of JP 2004-8122, Jan. 15, 2004.
English language Abstract of JP 61-289842, Dec. 19, 1986.
English language Abstract of JP 9-187251, Jul. 22, 1997.
English language Abstract of JP 2004-8004, Jan. 15, 2004.
English language Abstract of JP 2006-55012, Mar. 2, 2006.
English language Abstract of FR 2649591, Jan. 18, 1991.
Japan Office action, dated Jun. 12, 2012 along with an English language translation thereof.

* cited by examiner (a)

(b)

(c)

(d)

(e)

(f)

FOOD DOUGH FORMING APPARATUS AND FOOD DOUGH FORMING METHOD

TECHNICAL FIELD

The present invention relates to a food dough forming apparatus and a food dough forming method, and particularly relates to a food dough forming apparatus and a food dough forming method for joining end faces of a rod-shaped food dough to each other.

BACKGROUND ART

There has heretofore been known a bread dough producing apparatus for forming a bread dough into a ring form by crossing a portion near one end portion and another portion near the other end portion in the rod-shaped bread dough and tying the portions together. This technique is disclosed in Japanese Patent Application Laid-Open No. 2006-55012.

Incidentally, in the conventional producing apparatus, since the portions of the food dough are connected to each other, the connected portion has a crossing shape. Thus, there is a problem that the portions of the rod-shaped food dough cannot be joined together without the noticeable connected portion.

The present invention has been made in view of the problem described above. Therefore, it is an object of the present invention to provide a food dough fowling apparatus and a food dough forming method which are capable of joining end faces of rod-shaped food doughs together without making noticeable connections therebetween at the time of joining the end faces together.

DISCLOSURE OF THE INVENTION

In order to achieve the above object, a first aspect of the present invention is a food dough forming apparatus for joining together a first end face and a second end face of a rod-shaped food dough, the food dough forming apparatus including: deforming and facing means for deforming the food dough so as to cause the first end face and the second end face to face each other; and joining means for joining together the first end face and the second end face caused to face each other by the deforming and facing means.

A second aspect of the present invention is the food dough forming apparatus according to the first aspect, wherein, before the deformation by the deforming and facing means, a first portion of the food dough extending from the first end face and a second portion of the food dough extending from the second end face extend approximately parallel to each other with a predetermined interval therebetween, and the deforming and facing means causes the first end face and the second end face to face each other after obliquely tilting the first end face and the second end face by deforming a portion located near the first end face in the first portion and a portion located near the second end face in the second portion so that the portions are parted from each other.

A third aspect of the present invention is a food dough forming apparatus for forming a ring-shaped food dough by joining together one end face of a first rod-shaped food dough and one end face of a second rod-shaped food dough parted from the first food dough and extending parallel to the first food dough and by joining together the other end face of the first food dough and the other end face of the second food dough, the food dough forming apparatus including: first deforming and facing means for deforming the food doughs so as to cause the one end face of the first food dough and the one end face of the second food dough to face each other; first joining means for joining together the end faces caused to face each other by the first deforming and facing means; second deforming and facing means for deforming the food doughs so as to cause the other end face of the first food dough and the other end face of the second food dough to face each other; and second joining means for joining together the end faces caused to face each other by the second deforming and facing means.

A fourth aspect of the present invention is the food dough forming apparatus according to the third aspect, wherein the first deforming and facing means causes the one end face of the first food dough and the one end face of the second food dough to face each other after obliquely tilting the first end face and the second end face by deforming a portion located near the one end face in the first food dough and a portion located near the one end face in the second food dough so that the portions are parted from each other, and the second deforming and facing means causes the other end face of the first food dough and the other end face of the second food dough to face each other after obliquely tilting the first end face and the second end face by deforming a portion located near the other end face in the first food dough and a portion located near the other end face in the second food dough so that the portions are parted from each other.

A fifth aspect of the present invention is the food dough forming apparatus according to one of the third and fourth aspects, further including: first conveying means for conveying the food doughs in a longitudinal direction thereof; and second conveying means for conveying the food doughs conveyed by the first conveying means, in the longitudinal direction thereof, wherein the first deforming and facing means and the first joining means are means for causing the one end faces of the food doughs conveyed by the first conveying means to face each other and for joining the one end faces together, and the second deforming and facing means and the second joining means are means for causing the other end faces of the food doughs conveyed by the second conveying means to face each other and for joining the other end faces together.

A sixth aspect of the present invention is a food dough forming apparatus for joining together one end face of a first rod-shaped food dough and one end face of a second rod-shaped food dough parted from the first food dough and extending parallel to the first food dough, the food dough forming apparatus including: a mounting member having an approximately horizontal planar upper surface for mounting the food doughs thereon; a first outer aim rotated between a first position and a second position around a first axis which extends in a top-to-bottom direction and is located at a predetermined position, the first position being slightly away from the first food dough, the second position being where the first outer aim comes into contact with one end side portion located near the one end face in the first food dough, causes the one end side portion to approach the second food dough while bending and deforming the one end side portion into an arc shape, and thereby causes the one end face to face toward the second food dough; a first inner arm provided to the first outer arm so as to be rotatable around the first axis, the first inner atm being rotated between a third position slightly away from the first food dough and a fourth position where the first inner arm comes into contact with the one end side portion of the first food dough to part the one end side portion from the second food dough, sandwiches the first food dough in cooperation with the first outer arm present at the first position, and thereby tilts the one end face of the first food dough so as to cause the one end face of the first food dough to face toward the second food dough, the first inner arm being rotated from the fourth position to the third position together with the first outer arm while sandwiching the food dough in cooperation with the first outer arm when the first outer arm present at the first position is rotated from the first position to the second position; a second outer arm rotated between a fifth position and a sixth position around a second axis which extends in the top-to-bottom direction and is located at a predetermined position, the fifth position being slightly away from the second food dough, the sixth position being where the second outer arm comes into contact with one end side portion located near the one end face in of the second food dough, causes the one end side portion to approach the first food dough while bending and deforming the one end side portion into an arc shape, and thereby causes the one end face to face toward the first food dough; a second inner arm provided to the second outer arm so as to be rotatable around the second axis, the second inner arm being rotated between a seventh position slightly away from the second food dough and an eighth position where the second inner aim comes into contact with the one end side portion of the second food dough to part the one end side portion from the first food dough, sandwiches the second food dough in cooperation with the second outer arm present at the fifth position, and thereby tilts the one end face of the second food dough so as to cause the one end face of the second food dough to face toward the first food dough, the second inner arm being rotated from the eighth position to the seventh position together with the second outer arm while sandwiching the food dough in cooperation with the second outer arm when the second outer arm present at the fifth position is rotated from the fifth position to the sixth position; and approaching/parting means for causing the second outer arm and the second inner arm to relatively approach or part from the first outer arm and the first inner arm in a horizontal direction perpendicular to the longitudinal direction of the food doughs.

A seventh aspect of the present invention is a food dough forming method for joining together a first end face and a second end face of a rod-shaped food dough, the food dough forming method comprising: a deforming and facing step of deforming the food dough so as to cause the first end face and the second end face to face each other; and a joining step of joining together the end faces caused to face each other by the deforming and facing step.

An eighth aspect of the present invention is the food dough forming method according to the seventh aspect, wherein, before the deformation in the deforming and facing step, a first portion of the food dough extending from the first end face and a second portion of the food dough extending from the second end face extend approximately parallel to each other with a predetermined interval therebetween, and the deforming and facing step includes the steps of: deforming a portion located near the first end face in the first portion and a portion located near the second end face in the second portion so that the portions are parted from each other; obliquely tilting the first end face and the second end face; and causing the first end face and the second end face to face each other.

According to the first to eighth aspects of the present invention described above, in the food dough forming apparatus and the food dough forming method for joining the end faces of the rod-shaped food dough together, achieved is an effect of joining the end faces of the food dough together without noticeable connections therebetween.

BEST MODE FOR CARRYING OUT THE INVENTION

With reference to the drawings, an embodiment of the present invention will be described below.

Figure 1:
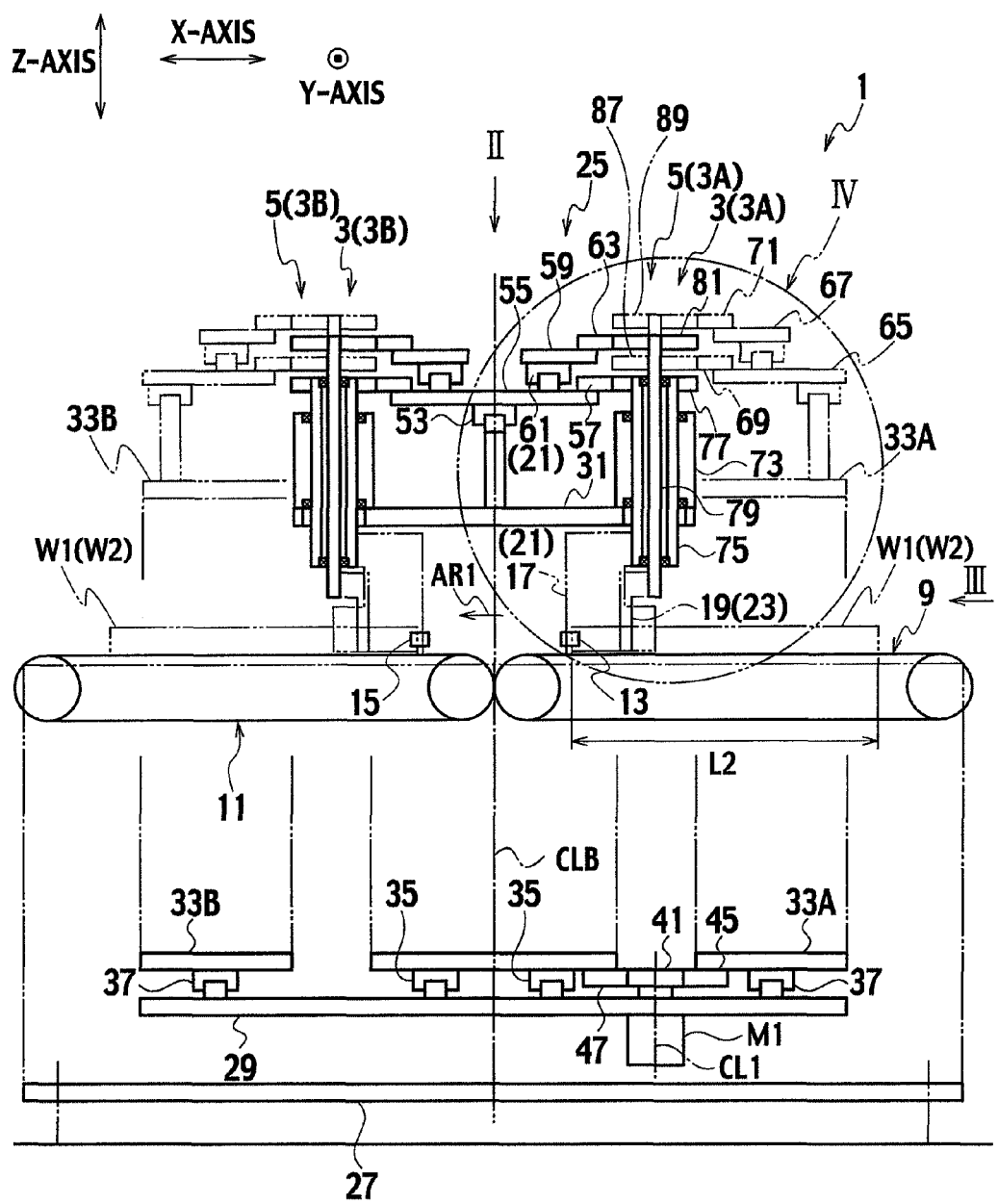
FIG. 1 is a front view showing a schematic configuration of a food dough forming apparatus 1 according to an embodiment of the present invention.
Figure 2:
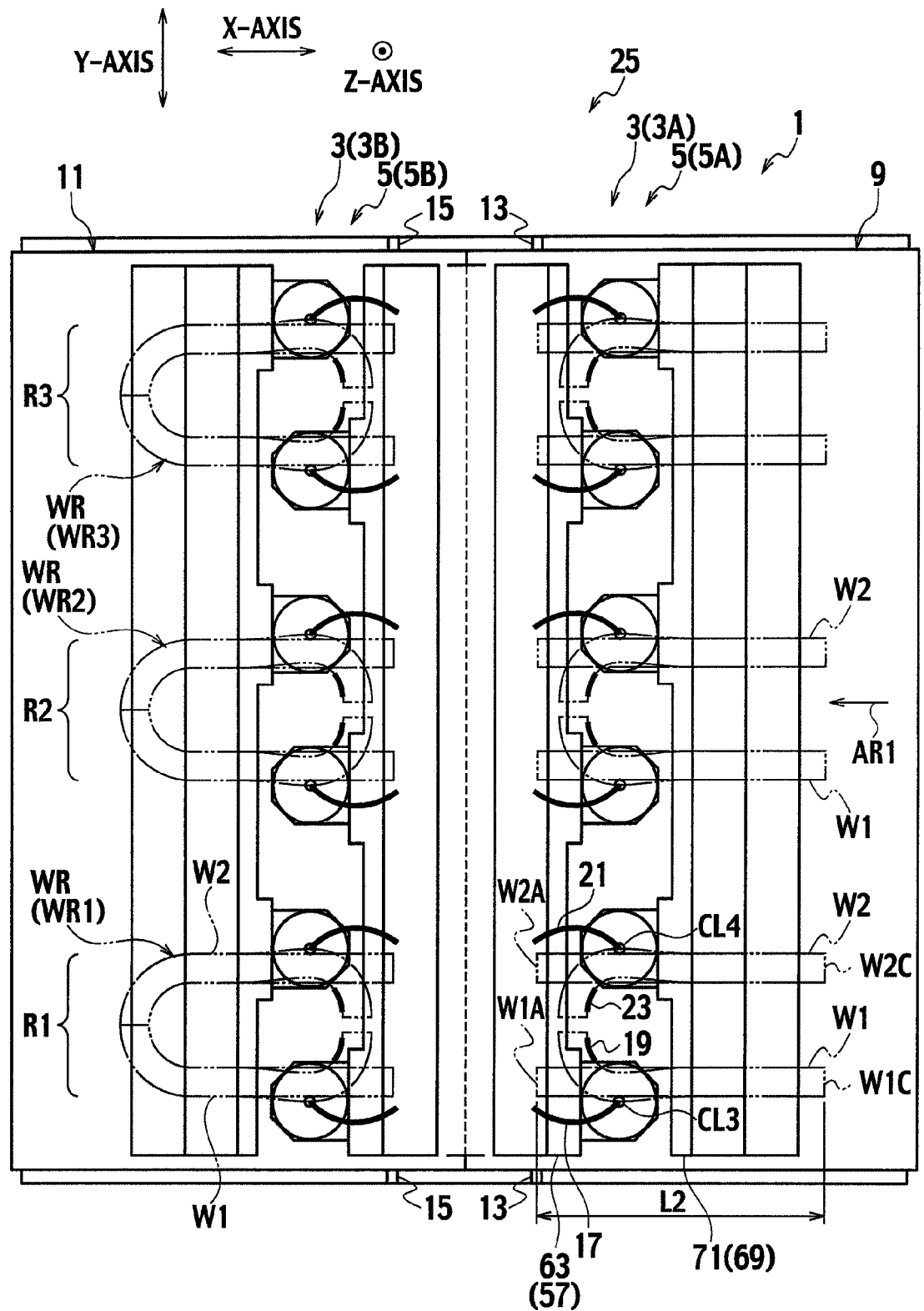
FIG. 2 is a plan view seen along an arrow II in FIG. 1, showing the schematic configuration of the food dough forming apparatus 1.

FIG. 1 is a front view showing a schematic configuration of a food dough forming apparatus 1 according to an embodiment of the present invention. FIG. 2 is a plan view seen along an arrow II in FIG. 1, showing the schematic configuration of the food dough forming apparatus 1.

Figure 3:
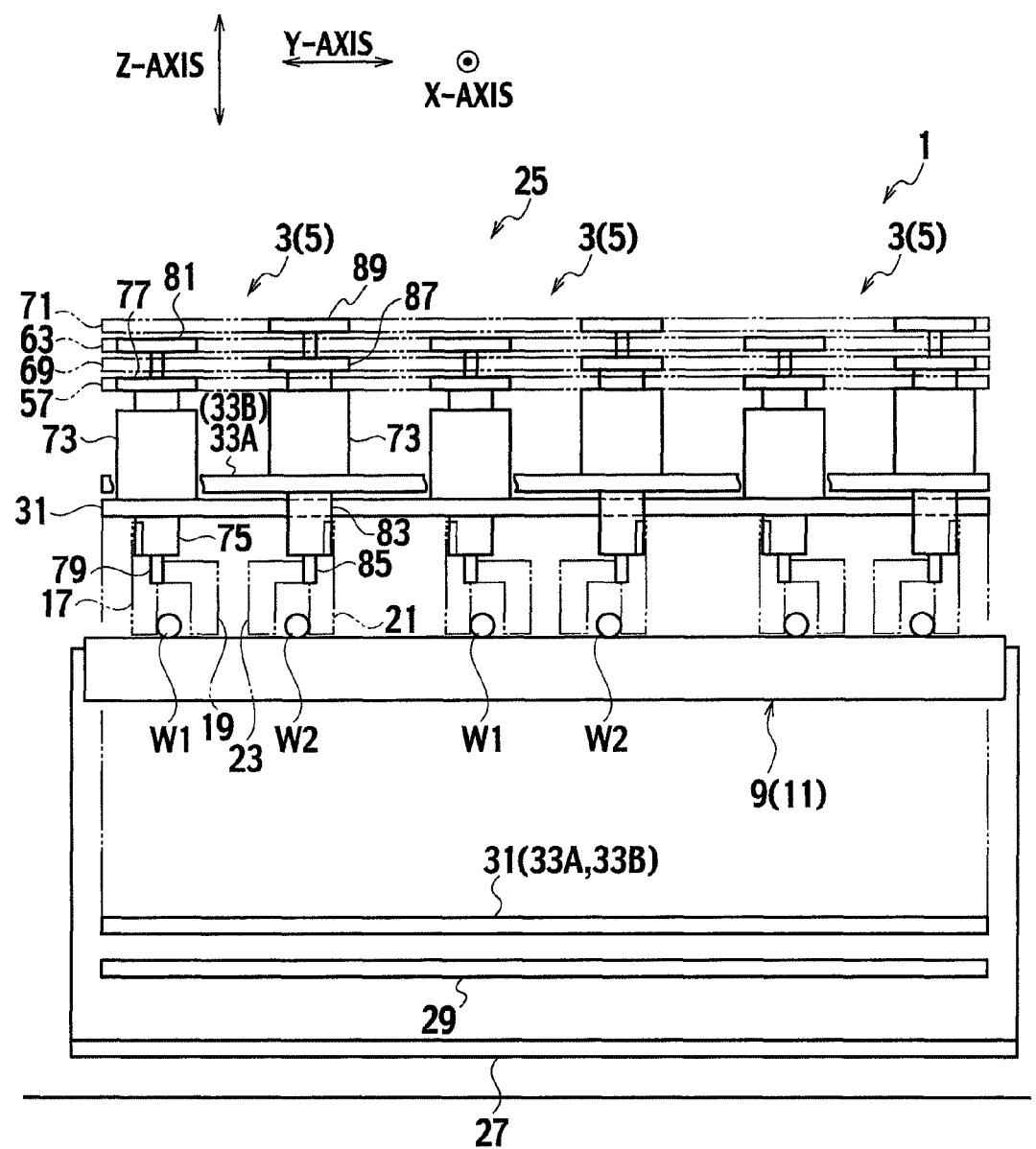
FIG. 3 is a side view seen along an arrow III in FIG. 1, showing the schematic configuration of the food dough forming apparatus 1.

FIG. 3 is a side view seen along an arrow III in FIG. 1, showing the schematic configuration of the food dough forming apparatus 1.

Figure 4:
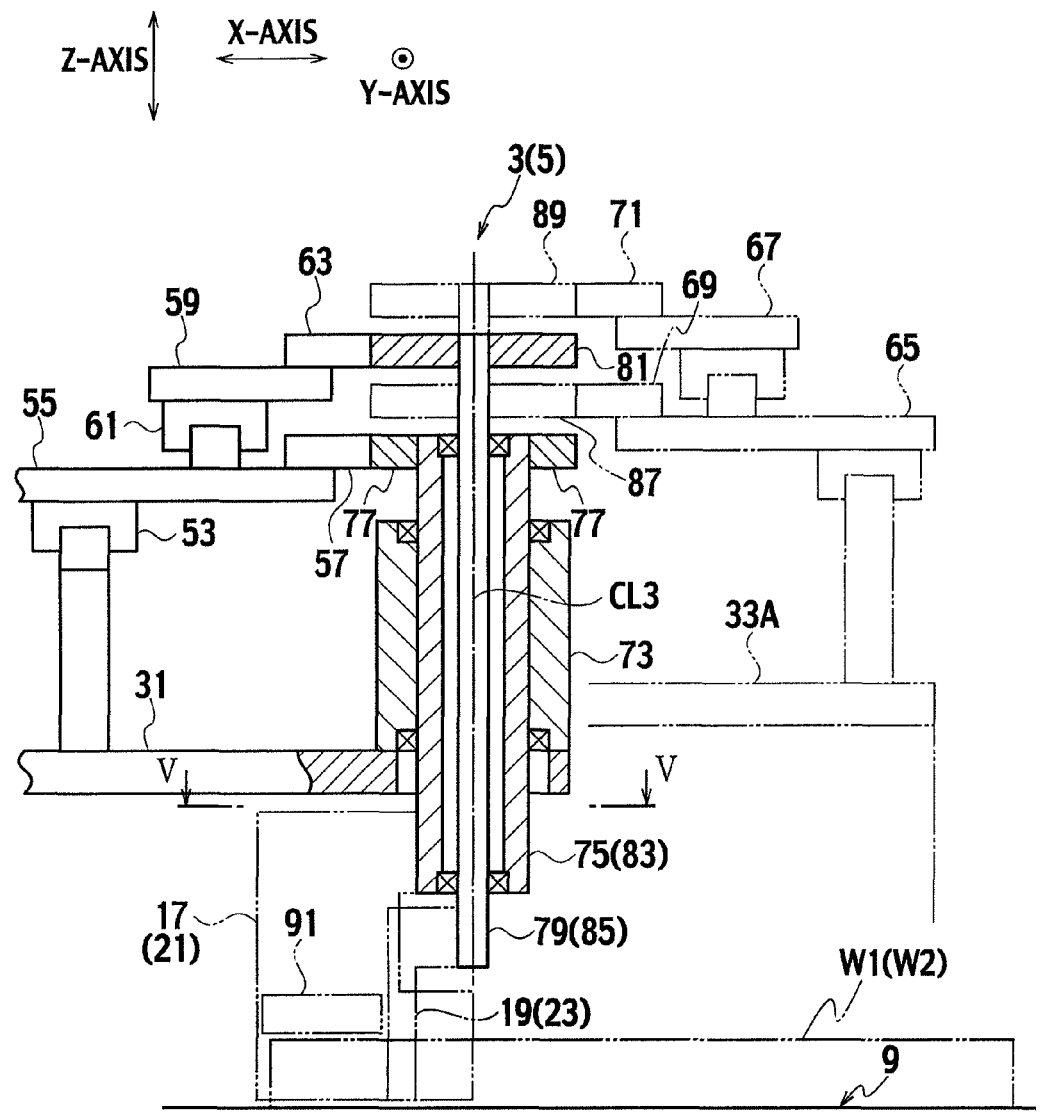
FIG. 4 is an enlarged view of a section IV in FIG. 1.
Figure 5:
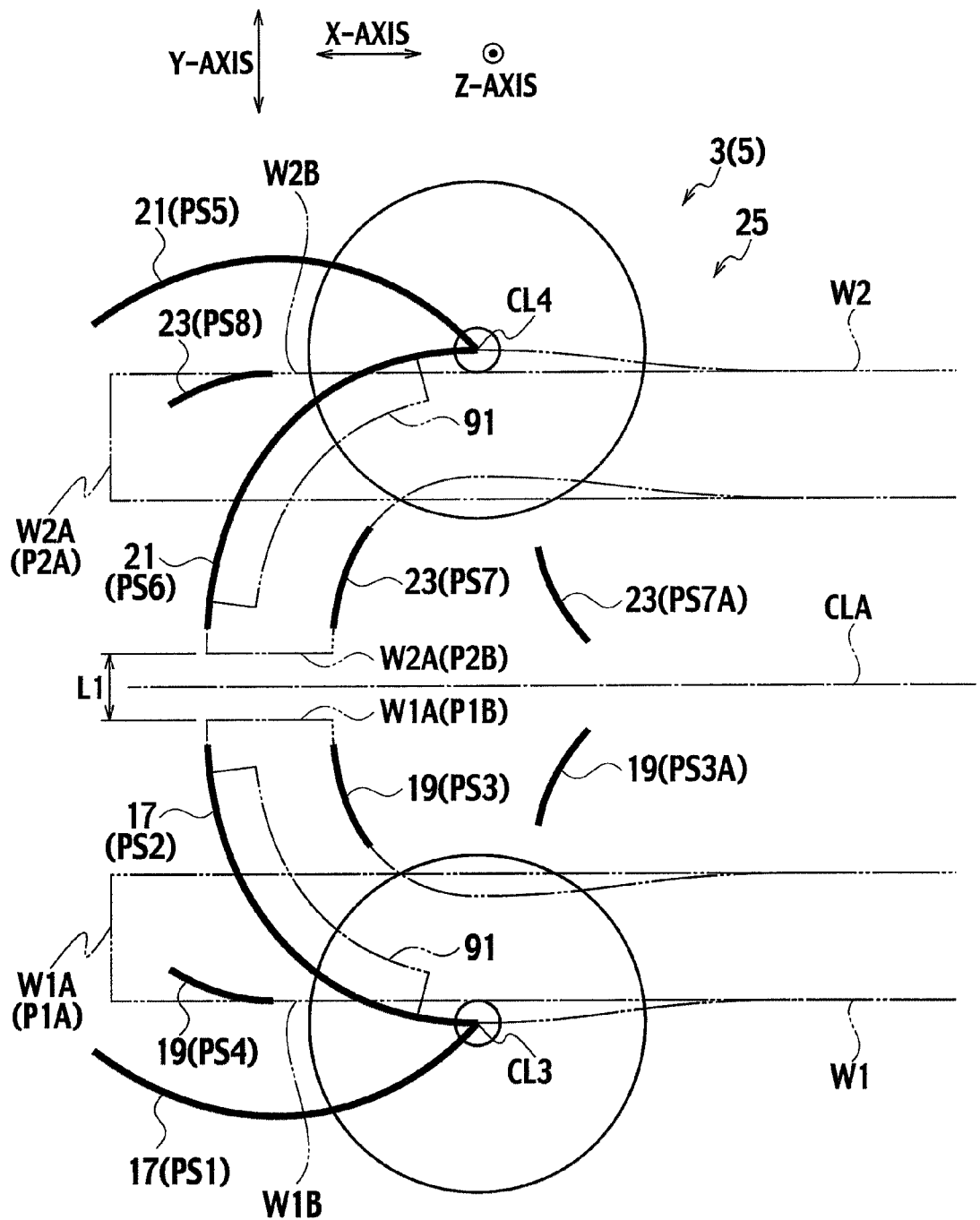
FIG. 5 is a view taken along arrows V-V in FIG. 4.

FIG. 4 is an enlarged view of a section IV in FIG. 1. FIG. 5 is a view taken along arrows V-V in FIG. 4.

In the following descriptions, for convenience of explanation, one horizontal direction may be called an X-axis direction, another horizontal direction perpendicular to the X-axis direction is may be called a Y-axis direction, and a direction (top-to-bottom direction; vertical direction) perpendicular to the X-axis and Y-axis directions is may be called a Z-axis direction.

As shown in FIGS. 2 and 4, the food dough forming apparatus 1 is an apparatus for joining together a planar end face W1A, in a longitudinal direction, of a food dough W1 such as a bread dough formed in a rod shape such as a cylindrical shape and a planar end face W2A, in a longitudinal direction, of a food dough W2 formed in a rod shape such as a cylindrical shape. The food dough forming apparatus 1 includes deforming and facing means (a deforming and facing section) 3 and joining means (a joining section) 5.

Each of the end faces W1A and W2A is obtained by cutting a rod-shaped food dough by a plane approximately perpendicular to the longitudinal direction of the food dough. Since each of the end faces W1A and W2A is left as is after the cutting, the food dough itself is exposed therefrom and thus each of the end face W1A and W2A has an adhesive property. Surfaces other than the one end faces W1A and W2A and the other end faces W1C and W2C, in the longitudinal directions, of the respective food doughs W1 and W2 are coated with powder such as flour and cornstarch for preventing stickiness of the food doughs W1 and W2. Being a material that undergo deformation and flow, the food doughs W1 and W2 actually change in shape under the influence of gravity and the like. However, in the present specification, for convenience of explanation, the shapes of the food doughs W1 and W2 may be expressed as "cylindrical shape" or the like.

The deforming and facing means 3 deforms the food doughs W1 and W2 so as to cause the end face W1A and the end face W2A to face each other in an approximately parallel manner with a predetermined distance therebetween. Moreover, the end faces W1A and W2A approximately overlap with each other when seen from a direction (the Y-axis direction) perpendicular to the end faces W1A and W2A in the state where the end faces W1A and W2A face each other.

The joining means 5 causes the end faces W1A and W2A, which are caused to face each other by the deforming and facing means 3, approach each other, thereby joining the end faces W1A and W2A together. The joining is performed by bringing the end faces W1A and W2A into surface contact with each other and by pressing the end faces with a force applied thereto in a direction (the Y-axis direction) approximately perpendicular to the contact surface.

With reference to FIG. 5, the deforming and facing means 3 deforms the food dough W1 so as to move the end face W1A positioned at P1A to P1B and deforms the food dough W2 so as to move the end face W2A positioned at P2A to P2B. In this event, a distance between the end faces W1A and W2A is L1.

The joining means 5 causes the end face W1A positioned at P1B and the end face W2A positioned at P2B to approach each other and thus brings the end faces W1A and W2A into surface contact with each other. Thereby, the end face W1A of the food dough W1 and the end face W2A of the food dough W2 are pressed against and thus joined to each other.

Before the deformation by the deforming and facing means 3, a portion W1B of the food dough W1 extending from the end face W1A and a portion W2B of the food dough W2 extending from the end face W2A extend approximately parallel to each other in the X-axis direction with a predetermined interval therebetween. The spacing between food doughs is in a direction transverse to the conveying or transport direction AR1, as illustrated in FIG. 2. Note that the end face W1A (the portion W1B) and the end face W2A (the portion W2B) are positioned at approximately the same position in the extending direction (the X-axis direction) of the portions W1B and W2B of the food doughs W1 and W2.

Figure 6:
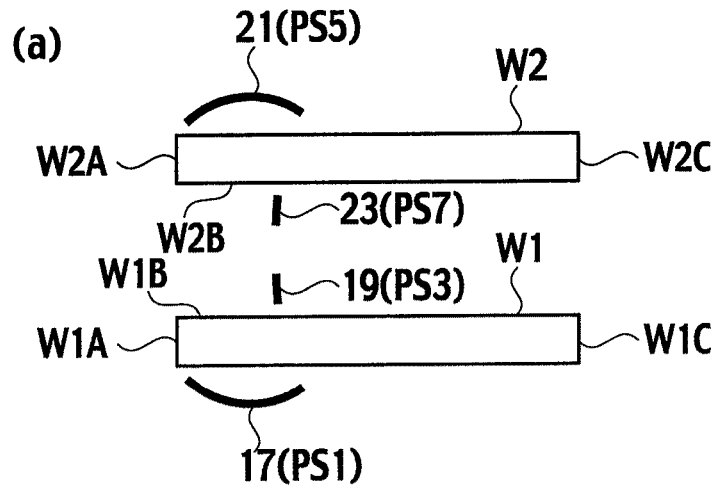
FIG. 6 is a view showing operations of the food dough forming apparatus 1.
Figure 6:
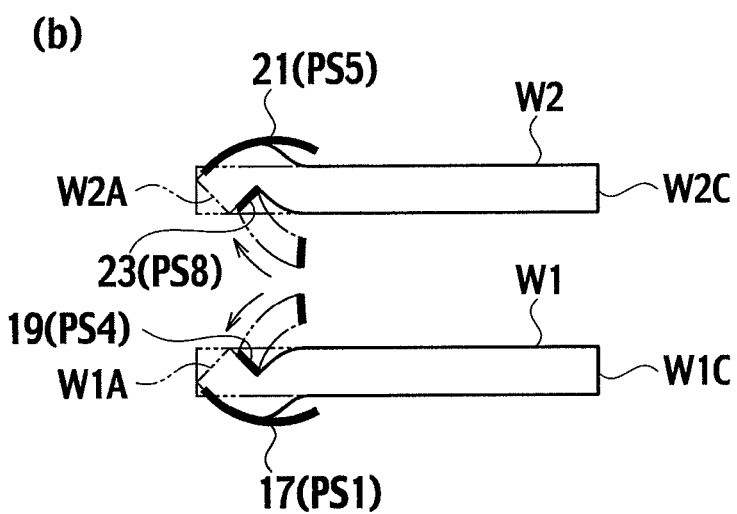
Figure 6:
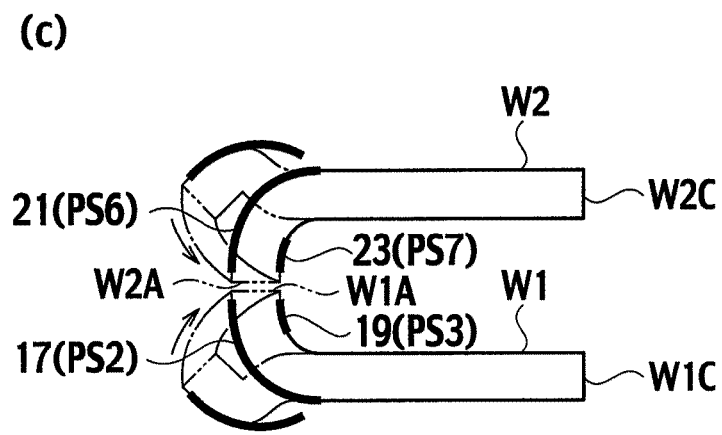

The deforming and facing section (means) 3 causes the end face W1A and the end face W2A to face each other after obliquely tilting the end face W1A and the end face W2A (see FIG. 6 (b)) by bending and deforming a portion located near the end face W1A in the portion W1B of the food dough W1 and a portion located near the end face W2A in the portion W2B of the food dough W2 so that the portions parted from each other. Thus, as illustrated in FIGS. 5, 6A and 6B, the adjacent end faces W1A and W2A are moved, by the deforming and facing section, by substantially 90°. Note that, in the obliquely tilted state, the end face W1A faces toward the end face W2A and the end face W2A faces toward the end face W1A.

The food dough forming apparatus 1 will be described in more detail.

The food dough forming apparatus 1 is an apparatus for forming a ring-shaped food dough by, as described above: joining together the one end face W1A, in the longitudinal direction, of the rod-shaped food dough W1 and the one end face W2A, in the longitudinal direction, of the rod-shaped food dough W2 positioned away from the food dough W1 and extending parallel to the food dough W1; and joining together the other end face (the same end face as the end face W1A) W1C, in the longitudinal direction, of the food dough W1 and the other end face (the same end face as the end face W2A) W2C, in the longitudinal direction, of the food dough W2.

Note that the food doughs W1 and W2 are initially positioned at approximately the same position in the extending direction (the X-axis direction) thereof. Therefore, the one end face W1A of the food dough W1 and the one end face W2A of the food dough W2 are positioned at approximately the same position in the X-axis direction as described above. The same goes for the other end faces W1C and W2C.

The one end faces W1A and W2A of the food doughs W1 and W2 are joined together by deforming and facing means (a deforming and facing section) 3A similar to the deforming and facing means 3 and joining means (a joining section) 5A similar to the joining means 5. Moreover, the other end faces W1C and W2C of the food doughs W1 and W2 are also joined together by deforming and facing means (a deforming and facing section) 3B similar to the deforming and facing means 3 and joining means (a joining section) 5B similar to the joining means 5.

Moreover, the food dough forming apparatus 1 includes a conveying section such as a belt conveyor 9 for conveying the food doughs W1 and W2 in the longitudinal direction thereof (the X-axis direction; direction indicated by an arrow AR1 in FIG. 2). On the downstream side of the belt conveyor 9, another conveying section such as a belt conveyor 11 is provided. The belt conveyor 11 receives the food doughs W1 and W2 conveyed by the belt conveyor 9 and then conveys the received food doughs W1 and W2 in the longitudinal direction thereof.

The deforming and facing means 3A and the joining means 5A cause the one end faces W1A and W2A, which are located on the downstream side of the food doughs W1 and W2 conveyed by the belt conveyor 9, to face and join each other. The deforming and facing means 3B and the joining means 5B are arranged on the downstream side of the deforming and facing means 3A and the joining means 5A. Moreover, the deforming and facing means 3B and the joining means 5B cause the other end faces W1C and W2C, which are located on the upstream side of the food doughs W1 and W2 conveyed by the belt conveyor 11, to face and join each other.

Further, the food dough fowling apparatus 1 includes an end face position detecting module such as a photoelectric sensor 13 for detecting that the one end faces (end faces located on the downstream side in the conveying direction) W1A and W2A of the food doughs W1 and W2 conveyed by the belt conveyor 9 have respectively reached predetermined positions.

Furthermore, the food dough forming apparatus 1 includes an end face position detecting module such as a photoelectric sensor 15 for detecting that the other end faces (end faces located on the upstream side in the conveying direction) W1C and W2C of the food doughs W1 and W2 conveyed by the belt conveyor 11 have respectively reached predetermined positions.

Under the control of an unillustrated control unit, the conveyance of the food doughs W1 and W2 by the belt conveyor 9 is stopped when the photoelectric sensors 13 detect the one end faces W1A and W2A of the food doughs W1 and W2. The food doughs W1 and W2 are then positioned respectively at predetermined positions and the one end faces W1A and W2A of the food doughs W1 and W2 are thereafter faced and joined to each other by the deforming and facing means 3A and the joining means 5A.

After the joining of the food doughs W1 and W2 by the deforming and facing means 3A and the joining means 5A, the food doughs W1 and W2 are conveyed by the belt conveyor 9 and the belt conveyor 11. Then, the conveyance of the food doughs W1 and W2 by the belt conveyor 11 is stopped when the photoelectric sensors 15 detect the other end faces W1C and W2C of the food doughs W1 and W2. Thereafter, the food doughs W1 and W2 are positioned respectively at predetermined positions and the other end faces W1C and W2C of the food doughs W1 and W2 are faced and joined to each other by the deforming and facing means 3B and the joining means 5B.

Thus, the food doughs W1 and W2 initially extending in the X-axis direction and arranged parallel to each other are molded into a ring-shaped ("O"-shaped) food dough WR.

On the upstream side of the belt conveyor 9, provided are a cutting unit (not shown) for cutting the food doughs extending in the X-axis direction into a predetermined length (for example, a length L2 shown in FIG. 1 and FIG. 2) and a conveying unit (for example, an unillustrated belt conveyor) for conveying the cut food doughs W1 and W2 to the belt conveyor 9. On the downstream side of the belt conveyor 11, provided is a conveying unit (for example, an unillustrated belt conveyor) for conveying the ring-shaped food dough WR.

The food dough forming apparatus 1 will be described in further detail.

As a mounting member for mounting the food doughs W1 and W2, an approximately horizontal planar upper surface is formed by a flat belt located above each of the belt conveyors 9 and 11.

In the food dough forming apparatus 1, as shown in FIG. 2, the food doughs W1 and W2 are conveyed in three rows R1, R2 and R3, each row having a pair of the food doughs W1 and W2, thereby simultaneously forming three ring-shaped food doughs WR1, WR2 and WR3. However, the food dough forming apparatus 1 may be configured to be able to simultaneously mold more or less than three ring-shaped food doughs or may be configured to be able to mold only one ring-shaped food dough WR1 at a time by conveying the food doughs W1 and W2 in the one row R1.

Moreover, description will be given below of the deforming and facing means 3A and the joining means 5A that deforms and joins together the food doughs (food doughs in the row R1) W1 and W2 located at the lowest part of FIG. 2 among the food doughs mounted on the conveyor 9. Here, it is assumed that the other deforming and facing means 3 (such as the deforming and facing means 3B) and the joining means 5 (such as the joining means 5B) also have the same configurations.

The deforming and facing means 3A includes a first outer arm 17, a first inner arm 19, a second outer arm 21 and a second inner arm 23. Moreover, the joining means 5A further includes approaching/parting means (an approaching/parting section) 25.

As shown in FIG. 4, the first outer arm 17 is present above an upper surface of the belt conveyor 9 with a slight distance between the first outer arm 17 and the upper surface in the top-to-bottom direction (the Z-axis direction) perpendicular to the upper surface of the belt conveyor 9. Moreover, in the longitudinal direction (the X-axis direction) of the food doughs W1 and W2, the first outer arm 17 is present on the one end face W1A (the belt conveyor 11) side as shown in FIG. 5. Furthermore, in the horizontal direction (the Y-axis direction) perpendicular to the longitudinal direction of the food doughs W1 and W2, the first outer arm 17 is present on the side opposite to the food dough W2 with the food dough W1 interposed therebetween.

Moreover, the first outer arm 17 is rotated between a first position PS1 and a second position PS2 around a first axis CL3 extending in the top-to-bottom direction and located at a predetermined position. At the first position PS1, the first outer arm 17 is slightly away from the food dough W1. As the first outer arm 17 is rotated toward the second position PS2, the first outer arm 17 comes into contact with the one end side portion W1B of the food dough W1, which is located near the end face W1A, and further pushes the one end side portion W1B so that the one end side portion W1B is bent and deformed into an arc shape and approaches the food dough W2. When rotated to the second position PS2, the first outer arm 17 causes the end face W1A to face toward the food dough W2 (the end face W1A is positioned at P1B).

Note that the portion of the first outer arm 17, which comes into contact with the food dough W1, is formed into an about ¼ arc shape, for example, when seen from the Z-axis direction.

The first inner arm 19 is present above the upper surface of the belt conveyor 9 with a slight distance between the first inner arm 19 and the upper surface in the Z-axis direction. Moreover, in the X-axis direction, the first inner arm 19 is present on the end face W1A side. Furthermore, in the Y-axis direction, the first inner arm 19 is present on the food dough W1 side between the food dough W1 and the food dough W2.

Moreover, the first inner arm 19 is provided to the first outer arm 17 so as to be rotatable around the rotation central axis CL3 of the first outer arm 17, and is rotated between a third position PS3 and a fourth position PS4.

At the third position PS3, the first inner arm 19 is slightly away from the food dough W1. When the first inner arm 19 is rotated toward the fourth position PS4, the first inner arm 19 comes into contact with the one end side portion W1B of the food dough W1 and pushes the one end side portion W1B toward the first outer arm 17, thereby separating the one end side portion W1B from the food dough W2. Moreover, at the fourth position PS4, the first inner arm 19 sandwiches the food dough W1 (the portion W1B) in cooperation with the first outer arm 17 present at the first position PS1 and tilts the end face W1A of the food dough W1 so as to cause the end face W1A of the food dough W1 to face toward the food dough W2 (see FIG. 6 (b)).

Furthermore, in rotating the first outer arm 17 present at the first position PS1 from the first position PS1 to the second position PS2 with the first inner arm 19 present at the fourth position PS4, the first inner arm 19 is rotated from the fourth position PS4 to the third position PS3 together with the first outer arm 17 while sandwiching the food dough W1 in cooperation with the first outer arm 17.

Note that the first inner arm 19 is rotated relative to the first outer arm 17. Thus, in a state where the first outer arm 17 is positioned at the second position PS2, the first inner arm 19 is rotated between the third position PS3 and an evading position PS3A.

Moreover, the portion of the first inner arm 19, which comes into contact with the food dough W1 is formed into an arc or linear shape shorter than the first outer arm 17 when seen from the Z-axis direction.

In addition, as shown in FIG. 5, about a center plane (center line) CLA, the second outer arm 21 and the second inner arm 23 are provided respectively as the first outer arm 17 and the first inner arm 19, and operated symmetrically. The center plane CLA is a plane developed in the X-axis direction and the Z-axis direction in a center portion between the food dough W1 and the food dough W2.

Specifically, the second outer arm 21 and the second inner arm 23 are rotated around a second axis CL4. The second outer arm 21 is rotated between a fifth position PS5 and a sixth position PS6, and the second inner arm 23 is rotated between an eighth position PS8 and an evading position PS7A through a seventh position PS7.

The approaching/parting means 25 causes the second outer arm 21 and the second inner arm 23 to relatively approach or part from the first outer arm 17 and the first inner arm 19 in the horizontal direction (the Y-axis direction) perpendicular to the longitudinal direction of the food doughs W1 and W2. Specifically, the approaching/parting means 25 causes the second axis CL4 to relatively approach or part from the first axis CL3 in the Y-axis direction.

To be more specific, in a state where the second outer arm 21 and the second inner arm 23 are parted from the first outer arm 17 and the first inner arm 19 by the approaching/parting means 25 and where the one end side portions W1B and W2B of the food doughs W1 and W2 are deformed into the arc shapes, the one end faces W1A and W2A of the food doughs W1 and W2 are parted from each other by a distance L1 as shown in FIG. 5. In a state where the second outer arm 21 and the second inner arm 23 are caused to approach the first outer arm 17 and the first inner arm 19 by the approaching/parting means 25, the one end faces W1A and W2A of the food doughs W1 and W2 come into contact with and pressed against each other. Thus, the end faces W1A and W2A are joined together.

Thereafter, the food doughs W1 and W2 having the one end faces W1A and W2A joined together are conveyed on the upper surface of the belt conveyor 11. Subsequently, as described above, the other end faces W1C and W2C are caused to face and join each other by the deforming and facing means 3B and the joining means 5B. Thus, the two rod-shaped food doughs W1 and W2 are molded into the ring-shaped food dough WR.

Note that the arms 17, 19, 21 and 23 are movable in the top-to-bottom direction (the Z-axis direction). In a state where each of the arms 17, 19, 21 and 23 is positioned at a downward end, the arms 17, 19, 21 and 23 are in contact with the food doughs (food doughs mounted on the belt conveyors 9 and 11) W1 and W2. Thus, the end faces W1A and W2A and the end faces W1C and W2C are caused to face and join each other. On the other hand, in a state where each of the arms 17, 19, 21 and 23 is positioned at an upward end, the arms 17, 19, 21 and 23 are away from the food doughs (food doughs mounted on the belt conveyors 9 and 11) W1 and W2. Thus, the food doughs W1 and W2 can be conveyed by the belt conveyors 9 and 11 without being interfered by the arms 17, 19, 21 and 23.

Incidentally, the food dough forming apparatus 1 includes a base 27. Above the base 27, the belt conveyor 9 and the belt conveyor 11 are provided.

The belt conveyors 9 and 11 have the food doughs W1 and W2 mounted on their approximately horizontal planar upper surfaces and drive belts by an actuator such as a motor to convey the mounted food doughs W1 and W2 in the longitudinal direction (the X-axis direction) of the food doughs W1 and W2. On both end portions, in a width direction (the Y-axis direction) on the downstream side, of the belt conveyor 9, the photoelectric sensors 13 are provided. On both ends, in the width direction on the upstream side, of the belt conveyor 11, the photoelectric sensors 15 are provided.

In an intermediate part of the base 27 in the top-to-bottom direction, a top-to-bottom-direction movement member 29 is provided. The top-to-bottom-direction movement member 29 is supported by the base 27 through an unillustrated linear guide bearing, and is movable in the Z-axis direction relative to the base 27. Moreover, the top-to-bottom-direction movement member 29 is positioned at an upper end position or a lower end position by an actuator such as a pneumatic cylinder. Furthermore, an elastic body (not shown) such as a tension spring is provided between the base 27 and the top-to-bottom-direction movement member 29 to reduce weights (weights supported by the pneumatic cylinder) of the top-to-bottom-direction movement member 29 and width-direction movement members 31, 33A, 33B and the like provided thereon. Thus, the top-to-bottom-direction movement member 29 is pulled upward.

Above the top-to-bottom-direction movement member 29, first width-direction movement member 31 and second width-direction movement members 33A and 33B are provided. The first width-direction movement member 31 is supported on the top-to-bottom-direction movement member 29 through linear guide bearings 35, and is movable in the Y-axis direction relative to the top-to-bottom-direction movement member 29.

The second width-direction movement members 33A and 33B are also supported on the top-to-bottom-direction movement member 29 through linear guide bearings 37 and 39, and are movable in the Y-axis direction relative to the top-to-bottom-direction movement member 29.

Moreover, above the base 27, a pinion 41 is provided, which is rotatable around an axis CL1 extending in the Z-axis direction. The pinion 41 is interlocked and coupled with an output shaft of a control motor M1. Accordingly, when the output shaft of the control motor M1 is normally rotated or reversely rotated, the pinion 41 is normally rotated or reversely rotated around the axis CL1.

A rack 45 provided integrally with the second width-direction movement member 33A and a rack 47 provided integrally with the first width-direction movement member 31 are engaged with the pinion 41. Note that the second width-direction movement member 33A and the second width-direction movement member 33B are integrally formed through an unillustrated connecting member. Specifically, the second width-direction movement members 33A and 33B are formed in a square shape (outline) formed with a square shape aperture (shape as a Japanese letter "口") in a planar view, and the first width-direction movement member 31 is provided inside the square-shaped second width-direction movement members 33A and 33B.

The first width-direction movement member 31 is moved between a position on one end side (front side of the sheet of FIG. 1) and a position on the other end side (back side of the sheet of FIG. 1) in the Y-axis direction by normally rotating or reversely rotating the output shaft of the control motor M1. Thus, the first width-direction movement member 31 is positioned at the one end side position or the other end side position.

The second width-direction movement members 33A and 33B are engaged with the first width-direction movement member 31 through the rack 41 and the pinion 47. Thus, in accordance with movement of the first width-direction movement member 31, the second width-direction movement members 33A and 33B are moved in a direction opposite to that of the first width-direction movement member 31 and then positioned.

When the first width-direction movement member 31 is positioned at the one end (on the front side of the sheet of FIG. 1), the second width-direction movement members 33A and 33B are positioned on the back side of the sheet of FIG. 1. This shows the parted state of the approaching/parting means 25. Accordingly, as shown in FIG. 5, the end face W1A of the portion W1B of the food dough W1 bent into the arc shape and the end face W2A of the portion W2B of the food dough W2 bent into the arc shape face each other with the distance L1 corresponding to the interval between the food doughs W1 and W2 conveyed in parallel.

On the other hand, when the first width-direction movement member 31 is positioned at the other end (on the back side of the sheet of FIG. 1), the second width-direction movement members 33A and 33B are positioned on the front side of the sheet of FIG. 1. This shows an approached state of the approaching/parting means 25. Accordingly, the end face W1A of the portion W1B of the food dough W1 bent into the arc shape and the end face W2A of the portion W2B of the food dough W2 bent into the arc shape shown in FIG. 5 come into contact with and pressed against each other (see FIG. 6(d)).

Note that the approached position and the parted position of the approaching/parting means 25 can be adjusted by controlling a rotation position of the output shaft of the control motor M1 that drives the pinion 41 to rotate. Thus, the above positions of the approaching/parting means 25 can correspond to various intervals of the food doughs W1 and W2 and can also adjust the amount of a pressing force on the joined surface between the end faces W1A and W2A.

Above the belt conveyors 9 and 11 and the first width-direction movement member 31, a rack supporting member 55 is provided. The rack supporting member 55 is supported by the first width-direction movement member 31 through a linear guide bearing 53, and is movable in the Y-axis direction relative to the first width-direction movement member 31. The rack supporting member 55 is moved between a position on one end side (front side of the sheet of FIG. 1) and a position on the other end side (back side of the sheet of FIG. 1) in the Y-axis direction by an unillustrated actuator such as a pneumatic cylinder. Thus, the rack supporting member 55 is positioned at the one end side position or the other end side position.

The rack supporting member 55 has a first outer arm rack 57 provided integrally therewith. Therefore, the first outer arm rack 57 is above and thus parted from the belt conveyor 9, has its longitudinal direction set to be the moving direction (the Y-axis direction) of the first width-direction movement member 31, and is movable in the Y-axis direction relative to the first width-direction movement member 31. Moreover, the first outer arm rack 57 is positioned at a position on one end side (front side of the sheet of FIG. 1) or a position on the other end side (back side of the sheet of FIG. 1).

Above the rack supporting member 55, another rack supporting member 59 is provided. The rack supporting member 59 is supported by the rack supporting member 55 through a linear guide bearing 61, and is movable in the Y-axis direction relative to the rack supporting member 55. The rack supporting member 59 is moved between a position on one end side (front side of the sheet of FIG. 1) and a position on the other end side (back side of the sheet of FIG. 1) in the Y-axis direction by an unillustrated actuator such as a pneumatic cylinder. Thus, the rack supporting member 59 is positioned at the one end side position or the other end side position.

The rack supporting member 59 has a first inner arm rack 63 provided integrally therewith. Therefore, the first inner arm rack 63 is above and thus parted from the belt conveyor 9, has its longitudinal direction set to be the moving direction (the Y-axis direction) of the rack supporting member 55, and is movable in the Y-axis direction relative to the rack supporting member 55. Moreover, the first inner arm rack 63 is positioned at a position on one end side (front side of the sheet of FIG. 1) or a position on the other end side (back side of the sheet of FIG. 1).

Similarly, rack supporting member 65 and rack supporting member 67 are provided to the second width-direction movement member 33A. The rack supporting member 65 has a second outer arm rack 69 provided integrally therewith, and the rack supporting member 67 has a second inner arm rack 71 provided integrally therewith.

A cylindrical bracket 73 is integrally provided on the downstream side of the belt conveyor 9 between the first width-direction movement member 31 and the rack supporting member 55 (in the Z-axis direction). A first cylindrical outer arm shaft member 75 is supported by the bracket 73 through bearings. The first outer arm shaft member 75 is rotatable relative to the bracket 73 (the first width-direction movement member 31) around the axis CL3 extending in the Z-axis direction. Moreover, in the top-to-bottom direction, the first outer arm shaft member 75 is above and thus parted from the belt conveyor 9 and protrudes from the bracket 73.

A pinion 77 is provided integrally with an upper portion of the first outer arm shaft member 75. The pinion 77 is engaged with the first outer arm rack 57. Moreover, the pinion 77 can be freely rotated and positioned between one rotation end and the other rotation end along with moving and positioning of the first outer arm rack 57.

The first outer arm 17 is provided integrally with a lower portion of the first outer arm shaft member 75. When the first outer min rack 57 is positioned on the front side of the sheet of FIG. 1, the first outer arm 17 is positioned at one rotation end. At the one rotation end, the first outer arm 17 is positioned at PS1 in FIG. 5. On the other hand, when the first outer arm rack 57 is positioned on the back side of the sheet of FIG. 1, the first outer arm 17 is positioned at the other rotation end. At the other rotation end, the first outer arm 17 is positioned at PS2 in FIG. 5.

A first cylindrical inner arm shaft member 79 is supported by the first outer arm shaft member 75 through bearings. The first inner arm shaft member 79 is rotatable relative to the first outer arm shaft member 75 around the axis CL3. Moreover, in the top-to-bottom direction, the first inner arm shaft member 79 is above and thus parted from the belt conveyor 9 and protrudes from the first outer arm shaft member 75.

A pinion 81 is provided integrally with an upper portion of the first inner arm shaft member 79. The pinion 81 is engaged with the first inner arm rack 63. Moreover, the pinion 81 can be freely rotated and positioned between one rotation end and the other rotation end along with moving and positioning of the first inner arm rack 63.

The first inner arm 19 is provided integrally with a lower portion of the first inner arm shaft member 79. When the first inner arm rack 63 is positioned on the back side of the sheet of FIG. 1, the first inner arm shaft member 79 is positioned at one rotation end. At the one rotation end, the first inner arm 19 is positioned at PS3 in FIG. 5 on the condition that the first outer atm rack 57 is positioned on the front side of the sheet of FIG. 1. On the other hand, when the first inner arm rack 63 is positioned on the front side of the sheet of FIG. 1, the first inner aim shaft member 79 is positioned at the other rotation end. At the other rotation end, the first inner arm 19 is positioned at PS4 in FIG. 5 on the condition that the first outer arm rack 57 is positioned on the front side of the sheet of FIG. 1.

A second outer arm shaft member 83, the second outer arm 21, a second inner arm shaft member 85 and the second inner arm 23 are provided in an approximately symmetrical manner about the center plane CLA in FIG. 5. However, in the Z-axis direction, positions of a pinion (a pinion provided integrally with the second outer arm shaft member 83) 87 and a pinion (a pinion provided integrally with the second inner arm shaft member 85) 89 are respectively different from those of the pinions 77 and 81.

The pinion 87 is engaged with the second outer arm rack 69, and the pinion 89 is engaged with the second inner arm rack 71.

When the second outer arm rack 69 is positioned on the front side of the sheet of FIG. 1, the second outer arm shaft member 83 is positioned at one rotation end. At the one rotation end, the second outer arm 21 is positioned at PS5 in FIG. 5. On the other hand, when the second outer arm rack 69 is positioned on the back side of the sheet of FIG. 1, the second outer arm shaft member 83 is positioned at the other rotation end. At the other rotation end, the second outer arm 21 is positioned at PS6 in FIG. 5.

Moreover, when the second inner aim rack 71 is positioned on the back side of the sheet of FIG. 1, the second inner arm shaft member 85 is positioned at one rotation end. At the one rotation end, the second inner atm 23 is positioned at PS7 in FIG. 5 on the condition that the second outer arm rack 69 is positioned on the front side of the sheet of FIG. 1. On the other hand, when the second inner arm rack 71 is positioned on the front side of the sheet of FIG. 1, the second inner arm shaft member 85 is positioned at the other rotation end. At the other rotation end, the second inner aim 23 is positioned at PS8 in FIG. 5 on the condition that the second outer arm rack 69 is positioned on the front side of the sheet of FIG. 1.

Similarly, outer arms, inner arms and the like are provided also above the belt conveyor 11 through the width-direction movement members 33B, 33 and the like. The outer arms, inner arms and the like provided above the belt conveyor 11 are provided in a symmetrical manner about a center plane (center line) CLB developed in the Y-axis direction and the Z-axis direction between the belt conveyors 9 and 11.

Moreover, the food dough forming apparatus 1 is provided with apart means (an apart section). When the food doughs stick to the arms 17, 19, 21 and 23, the apart means parts the sticking food doughs from the arms 17, 19, 21 and 23.

The apart means includes, for example, arc-shaped plate-like members 91 each having a predetermined width (see FIG. 4). The arc-shaped members 91 are supported by the first outer arm 17 and the second outer arm 21 through linear bearings (not shown), respectively, and are movable relative respectively to the first outer arm 17 and the second outer arm 21 in the Z-axis direction by unillustrated actuators such as pneumatic cylinders, respectively. When the food doughs W1 and W2 are molded by the arms 17, 19, 21 and 23 each positioned at the downward end, the members 91 are positioned at upward ends and thus do not come into contact with the food doughs W1 and W2.

On the other hand, when the arms 17, 19, 21 and 23 are lifted after completion of the forming of the food doughs W1 and W2, the members 91 are lowered and come into contact with the food doughs W1 and W2 to push the food doughs W1 and W2 downward. Thus, the food doughs W1 and W2 are parted from the arms 17, 19, 21 and 23.

Next, operations of the food dough forming apparatus 1 will be described.

Figure 7:
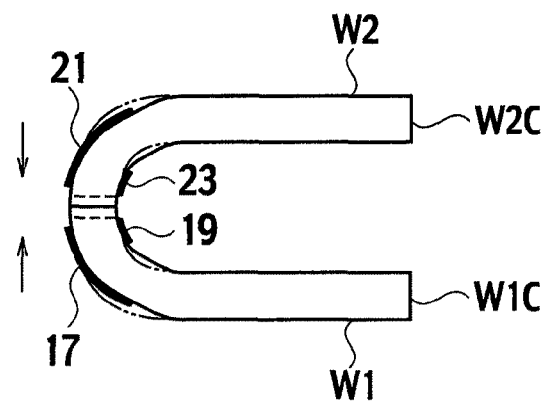
FIG. 7 is a view showing operations of the food dough forming apparatus 1.
Figure 7:
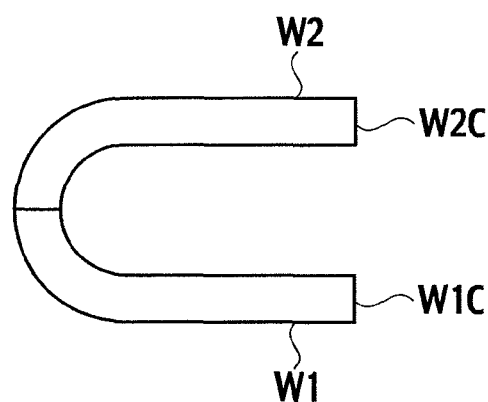
Figure 7:
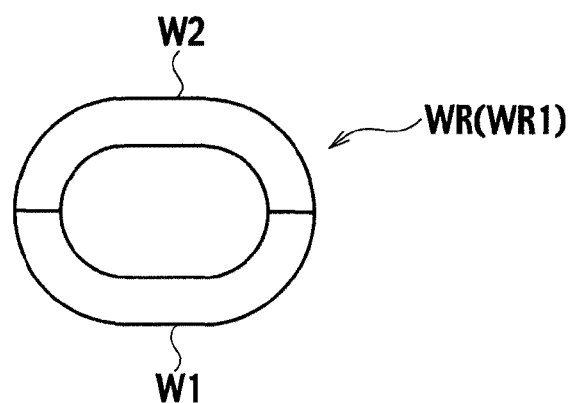

FIG. 6 and FIG. 7 are views showing operations of the food dough forming apparatus 1.

First, as an initial state, the food doughs W1 and W2 are mounted on the upstream side of the belt conveyor 9 and the top-to-bottom-direction movement member 29 is positioned at the upper end (the arms 17, 19, 21 and 23 are lifted). The first width-direction movement member 31 is positioned on the front side of the sheet of FIG. 1 and the second width-direction movement members 33A and 33B are positioned on the back side of the sheet of FIG. 1 (the axes CL3 and CL4 are in a parted state). The outer arms 17 and 21 are positioned at PS1 and PS5, respectively, and the inner arms 19 and 23 are positioned at PS3 and PS7, respectively.

In the initial state, under the control of the control unit, the belt conveyor 9 is driven to convey the food doughs W1 and W2. Upon detection of the leading end faces W1A and W2A of the food doughs W1 and W2 by the photoelectric sensors 13, the belt conveyor 9 is stopped and the top-to-bottom-direction movement member 29 is lowered (the aims 17, 19, 21 and 23 are lowered) and positioned at the downward end (see FIG. 6 (a)).

Thereafter, the inner arms 19 and 23 are rotated respectively to PS4 and PS8 to part the portion W1B of the food dough W1 from the portion W2B of the food dough W2 and respectively sandwich the portions W1B and W2B in cooperation with the outer arms 17 and 21 (see FIG. 6 (b)).

Subsequently, the outer arms 17 and 21 are rotated to PS2 and PS6, respectively. Along with this rotation, the inner arms 19 and 23 are rotated to PS3 and PS7, respectively, thereby causing the end face W1A of the food dough W1 and the end face W2A of the food dough W2 to face each other (see FIG. 6 (c)).

Next, the first width-direction movement member 31 is moved to the position on the back side of the sheet of FIG. 1 and the second width-direction movement members 33A and 33B are moved to the position on the front side of the sheet of FIG. 1. Accordingly, the end face W1A of the food dough W1 and the end face W2A of the food dough W2 are brought into contact with and pressed against each other (see FIG. 7 (d)), thereby joining the food doughs W1 and W2 together (see FIG. 7 (e)).

Thereafter, the inner arms 19 and 23 are rotated to the evading positions PS3A and PS7A, respectively, while leaving the outer arms 17 and 21 at PS2 and PS6, respectively. Thus, the inner arms 19 and 23 are parted from the food doughs W1 and W2.

Subsequently, the top-to-bottom-direction movement member 29 is lifted, the food doughs W1 and W2 are parted from the arms 17, 19, 21 and 23 by the apart means (apart section) 91 as needed, and the outer arms 17 and 21 are rotated to be positioned at PS1 and PS5, respectively. Along with this rotation, the inner arms 19 and 23 are also rotated to PS3 and PS7, respectively. Moreover, the first width-direction movement member 31 is moved to the position on the front side of the sheet of FIG. 1 and the second width-direction movement members 33A and 33B are moved to the position on the back side of the sheet of FIG. 1.

The food doughs W1 and W2 molded into a "U" shape by joining together the leading end faces W1A and W2A of the food doughs W1 and W2 are conveyed toward the downstream side by driving the belt conveyors 9 and 11. Upon detection of the rear end faces W1C and W2C of the food doughs W1 and W2 by the photoelectric sensors 15, the belt conveyor 11 is stopped and the rear end faces W1C and W2C are joined together as in the case of the joining of the leading end faces W1A and W2A. Thus, the food doughs W1 and W2 are molded into a ring shape (see FIG. 7 (f)).

Thereafter, the belt conveyor 11 is driven to convey the ring-shaped food dough WR out of the food dough forming apparatus 1. If the food dough is a fermented dough such as a bread dough, the ring-shaped food dough WR is transferred onto a baking sheet having a circular concave portion that follows the ring shape for final fermentation. This final fermentation further strengthens the connection between the joined surfaces of the food doughs W1 and W2. Subsequently, the ring-shaped food dough WR is baked in an oven or the like and thus a ring-shaped bread is made.

According to the food dough forming apparatus 1, after the food doughs W1 and W2 are deformed so as to cause the end faces W1A and W2A to face each other, the end faces W1A and W2A facing each other are brought into surface contact with each other and are pressed against and joined to each other by applying a force thereto in a direction approximately perpendicular to the contact surface. Thus, the food doughs W1 and W2 can be joined together without noticeable connections therebetween.

Moreover, according to the food dough forming apparatus 1, after tilting the end faces W1A and W2A by separating once the portions W1B and W2B of the food doughs W1 and W2 from each other, the portions W1B and W2B are caused to approach each other, thereby causing the end faces W1A and W2A to face each other. Thus, a reverse internal stress is temporarily generated in the portions W1B and W2B of the food doughs W1 and W2. Accordingly, when the end faces W1A and W2A are caused to face each other by causing the portions W1B and W2B to approach each other, the food doughs W1 and W2 are easily deformed. Moreover, since the end faces W1A and W2A are caused to face each other after being tilted once, the shapes of the end faces W1A and W2A are unlikely to be distorted as compared with the case where the end faces W1A and W2A are caused to face each other directly. Thus, the end faces W1A and W2A can be accurately joined together.

Moreover, according to the food dough forming apparatus 1, the one end faces W1A and W2A of the food doughs W1 and W2 are joined together and the other end faces W1C and W2C of the food doughs W1 and W2 are joined together. Thus, the ring-shaped food dough WR without noticeable connections can be formed.

Furthermore, according to the food dough forming apparatus 1, the deforming and facing means 3A and 3B are arranged with a predetermined interval therebetween. The deforming and facing means 3A and 3B join together the one end faces W1A and W2A of the food doughs W1 and W2 on the upper surface of the belt conveyor 9 and also join together the other end faces W1C and W2C of the food doughs W1 and W2 on the upper surface of the belt conveyor 11 arranged on the downstream side of the belt conveyor 9 and operated partedly from the belt conveyor 9. Thus, forming of the ring-shaped food dough WR can be stably performed without changing the interval between the deforming and facing means 3A and 3B even when the length L2 of the food dough to be conveyed (molded) varies.

Incidentally, in the food dough forming apparatus 1, the two rod-shaped food doughs W1 and W2 are molded into one ring-shaped food dough. However, one "U"-shaped food dough may be molded into one ring-shaped food dough.

Moreover, what has been described according to the above embodiment may be grasped as an invention of a food dough forming method.

Specifically, what has been described according to the above embodiment may be grasped as an invention of a food dough forming method for joining together a first end face of a rod-shaped food dough and a second end face of another rod-shaped food dough, the method including: a deforming and facing step of deforming the food doughs so as to cause the first end face and the second end face to face each other; and a joining step of joining together the end faces caused to face each other by the deforming and facing step.

Furthermore, what has been described according to the above embodiment may be grasped as the food dough forming method, in which, before the deformation by the deforming and facing step, a first portion, which is a portion of the food dough extending from the first end face, and a second portion, which is a portion of the food dough extending from the second end face, extend approximately parallel to each other with a predetermined interval therebetween, and the deforming and facing step is a step of causing the first end face and the second end face to face each other after obliquely tilting the first end face and the second end face by deforming a portion located near the first end face in the first portion and a portion located near the second end face in the second portion so that the portions are parted from each other.

The present invention is not limited to the above description of the embodiment of the invention, but can be carried out in various other forms by making appropriate changes thereto.

Note that the entire contents of Japanese Patent Application No. 2007-107417 (filed on Apr. 16, 2007) are incorporated herein by reference.

The invention claimed is:

1. A food dough forming apparatus for forming a ring-shaped food dough by joining together one end face of a first rod-shaped food dough and one end face of a second rod-shaped food dough spaced from the first food dough and extending parallel to the first food dough and by joining together the other end face of the first food dough and the other end face of the second food dough, the food dough forming apparatus, comprising:
   a first deforming and facing section structured to deform the first and second food doughs so as to cause the one end face of the first food dough and the one end face of the second food dough to face each other;
   a first joiner configured to join together the end faces caused to face each other by the first deforming and facing section;
   a second deforming and facing section structured to deform the first and second food doughs so as to cause the other end face of the first food dough and the other end face of the second food dough to face each other; and
   a second joiner configured to join together the end faces caused to face each other by the second deforming and facing section;
   wherein each of the end faces extending in a first plane transverse to a conveying direction of the first rod shaped food dough and the second rod shaped food dough, each of the first deforming and facing section and the second deforming and facing section being structured to deform the first and second food doughs by movement within a second plane parallel to the conveying direction and without movement of the food doughs out of the second plane parallel to the conveying direction.

2. The food dough forming apparatus according to claim 1, wherein
   the first deforming and facing section causes the one end face of the first food dough and the one end face of the second food dough to face each other after obliquely tilting the first end face and the second end face by deforming a portion of the first food dough located near the one end face of the first food dough and a portion of the second food dough located near the one end face of the second food dough so that the portions are spaced from each other by a distance larger than a distance between the portions prior to the deforming, and
   the second deforming and facing section causes the other end face of the first food dough and the other end face of the second food dough to face each other after obliquely tilting the first end face and the second end face by deforming a portion of the first food dough located near the other end face of the first food dough and a portion of the second food dough located near the other end face of the second food dough so that the portions are spaced from each other by a distance larger than a distance between the portions prior to the deforming.

3. The food dough forming apparatus according to claim 1, further comprising:
   a first conveyer that conveys the food doughs in a longitudinal direction of the first conveyer; and a second conveyer that conveys the food doughs conveyed by the first conveyor, in the longitudinal direction of the second conveyer, wherein the first deforming and facing section and the first joining section cause the one end faces of the food doughs conveyed by the first conveyor to face each other and join the one end faces together, and the second deforming and facing section and the second joiner cause the other end faces of the food doughs conveyed by the second conveyer to face each other and join the other end faces together.

4. The food dough forming apparatus according to claim 2, further comprising:

a first conveyer that conveys the food doughs in a longitudinal direction of the first conveyer; and a second conveyer that conveys the food doughs conveyed by the first conveyor, in the longitudinal direction of the second conveyer, wherein the first deforming and facing section and the first joiner cause the one end faces of the food doughs conveyed by the first conveyor to face each other and join the one end faces together, and the second deforming and facing section and the second joiner cause the other end faces of the food doughs conveyed by the second conveyer to face each other and join the other end faces together.

5. A food dough forming apparatus join together one end face of a first rod-shaped food dough and one end face of a second rod-shaped food dough spaced from the first food dough and extending parallel to the first food dough, the food dough forming apparatus, comprising:

a mounting member having an approximately horizontal planar upper surface for receiving the food doughs on the planar upper surface;

a first outer arm rotated between a first position and a second position around a first axis which extends in a vertical direction and is located at a predetermined position, the first position being slightly spaced from the first food dough, the second position being in contact with one end side portion located near the one end face of the first food dough, causes the one end side portion to approach the second food dough while bending and deforming the one end side portion into an arc shape, and thereby causes the one end face to face toward the second food dough;

a first inner arm provided to the first outer arm so as to be rotatable around the first axis, the first inner arm being rotated between a third position slightly spaced from the first food dough and a fourth position in contact with the one end side portion of the first food dough to separate the one end side portion from the second food dough, the first inner arm sandwiches the first food dough in cooperation with the first outer arm in the first position, and thereby tilts the one end face of the first food dough so as to cause the one end face of the first food dough to face toward the second food dough, the first inner arm being rotated from the fourth position to the third position together with the first outer arm while sandwiching the food dough in cooperation with the first outer arm when the first outer arm in the first position is rotated from the first position to the second position;

a second outer arm rotated between a fifth position and a sixth position around a second axis which extends in the vertical direction and is located at a predetermined position, the fifth position being slightly spaced from the second food dough, the sixth position being in contact with one end side portion located near the one end face in of the second food dough, causes the one end side portion to approach the first food dough while bending and deforming the one end side portion into an arc shape, and thereby causes the one end face to face toward the first food dough;

a second inner arm provided to the second outer arm so as to be rotatable around the second axis, the second inner arm being rotated between a seventh position slightly spaced from the second food dough and an eighth position in contact with the one end side portion of the second food dough to separate the one end side portion from the first food dough, the second inner arm sandwiches the second food dough in cooperation with the second outer arm in the fifth position, and thereby tilts the one end face of the second food dough so as to cause the one end face of the second food dough to face toward the first food dough, the second inner arm being rotated from the eighth position to the seventh position together with the second outer arm while sandwiching the food dough in cooperation with the second outer arm when the second outer arm in the fifth position is rotated from the fifth position to the sixth position; and an approaching/parting section that causes the second outer arm and the second inner arm to relatively approach or part from the first outer arm and the first inner arm in a horizontal direction perpendicular to a longitudinal direction of the food doughs.

* * * * *